Oct. 27, 1925.                                                                1,559,146
P. A. ANDREWS
METHOD OF MAKING ARTIFICIALLY INTEGRATED SHAPED BODIES AND THE
PRODUCT OF SAID METHOD
Filed May 7, 1924

Inventor
Philip A. Andrews
by Roberts, Roberts & Cushman
his Att'ys

Patented Oct. 27, 1925.

1,559,146

UNITED STATES PATENT OFFICE.

PHILIP A. ANDREWS, OF WAUKEGAN, ILLINOIS, ASSIGNOR TO JOHNS-MANVILLE, INC., OF NEW YORK, N. Y., A CORPORATION OF NEW YORK.

METHOD OF MAKING ARTIFICIALLY-INTEGRATED SHAPED BODIES AND THE PRODUCT OF SAID METHOD.

Application filed May 7, 1924. Serial No. 711,631.

*To all whom it may concern:*

Be it known that I, PHILIP A. ANDREWS, a citizen of the United States of America, and resident of Waukegan, in the county of Lake and State of Illinois, have invented new and useful Improvements in Methods of Making Artificially-Integrated Shaped Bodies and the Products of Said Methods, of which the following is a specification.

This invention relates to artificially-integrated shaped bodies of tough and relatively infrangible pressure—and friction-resistant materials (suitable for brake and clutch linings or facings and other purposes), and to the art or method of making such bodies. One object is to provide an improved way of making a dense, shaped body of high mechanical resistance, capable of withstanding high temperatures without disintegration, and capable of reduction by wear without alteration of its qualification for the indicated uses.

Materials and articles of the kind referred to are required to be resistant to the severe breaking strains, pressure, friction, attrition and high temperatures incidental to use as the contact shoe or surface of the brake-block or clutch lining or the like for which they are principally in demand, and it is essential that the mechanical structure produced shall be sufficiently tough, infrangible and solid to resist the stresses and strains of such uses without deformation; sufficiently uniform in structure to continuously present the same character of suitable new surfaces when worn down; and sufficiently heat resistant to prevent deterioration by the heat produced. This invention provides such materials and articles made of them, and a method or art of producing the materials and articles.

The method recommended comprises assembly and mixture of suitable heat-resistant fibrous materials, such as asbestos fiber, crude or refined, with a cementitious binder in a relatively dry, bibulous or anhydrous state and capable of solidification or setting upon treatment with water or other reagent; securing homogeneity and absence of gross voids by molding the mass in this relatively non-fictile and dry state to the desired shape with the aid of suitable pressure; subjecting the molded result to the action of a cement-setting reagent in such a way as to retain the molded form; drying, and impregnating the product with a fluid capable of subsequent uniform solidification.

The specific application of the method may be modified in commercial adaptation to accord with the particular uses, the materials and facilities available, in order to provide a variety of finished products having various properties depending upon their particular intended uses; representative procedures will now be described, as related to the manufacture of brake blocks, for examples only of the procedure and products according to the invention.

In the accompanying drawings.

Figure 1:
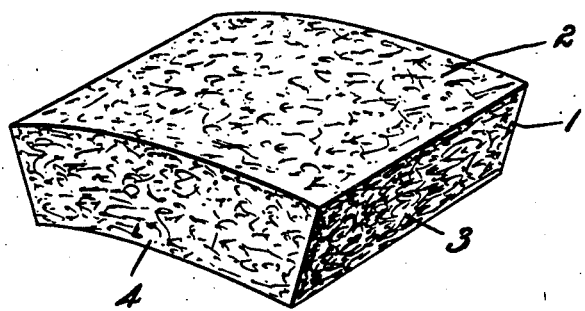
Fig. 1 is a perspective of a molded block according to the invention.

In the drawings, the segmental block 1 may have a molded, ground or machined cylindrical face 2 and side surfaces 3 and 4 formed by molding; or by molding an annulus or a larger segment of an annulus and sawing into the form shown. Preferably the molded form corresponds in dimensions closely to the finished product illustrated, grinding or machining operations being relied upon for a finished surface only, as distinguished from any necessity to make to shape by cutting from a larger mass.

Figure 2:
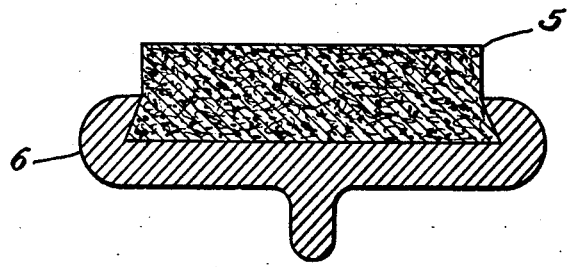
Fig. 2 is a transverse section of a metal brake shoe showing a block according to the invention formed in place.

Blocks of the kind typified by the block 5 of Fig. 2 may be formed in part in an undercut cavity of a metal brake-shoe 6 of any desired form.

Figure 3:
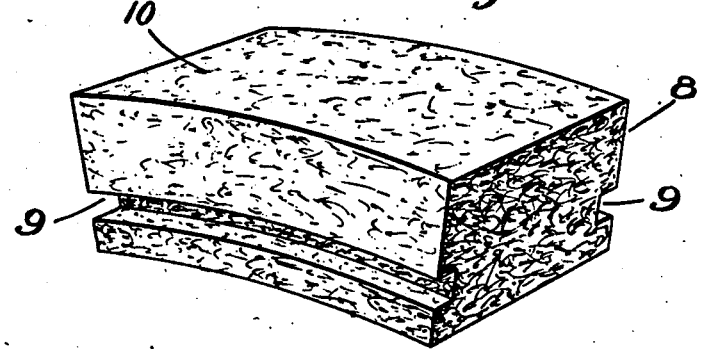
Fig. 3 is a perspective of a block illustrating a typical instance of a product according to the invention.

Blocks of the kind typified by the block 8 of Fig. 3 may be molded to provide the channels 9 and the remaining surfaces, or have its cylindrical working-face 10 only ground or machined.

Whatever the particular form of block, collar, disk, annulus or segment of a geometrical solid desired for the intended use, this invention provides a method of producing the formed object or piece out of a material highly satisfactory in respect to frictional effect, great strength, great durability, and resistance to destructive change by heat; and also provides a way of producing the product in a form requiring a minimum of grinding, machining or finishing.

As a base material, asbestos fibre, crude or refined, may be employed, but ordinarily asbestos fibre wastes, waste asbestos yarn, or picker stock from asbestos felts or woven fabrics, are entirely satisfactory for the purpose, short fibre asbestos, scrap asbestos yarn, and waste from weaving asbestos-covered metal-core yarns, or mixtures of these being typical suitable material.

This, or other suitable material, prepared by carding or opening operations, is integrated into a compact mass of the desired qualities by mixing and molding it together with components of a cementitious binder, causing the cementing reaction to take place while the material retains a compressed molded form; driving off any excess of uncombined liquid in the integrated block; and impregnating with a suitable solidifiable interpenetrating impregnant serving to fill the voids, to inhibit further chemical reactions, and usefully to modify the frictional effect of any surface of the impregnated cement-integrated fibrous mass.

As a step to this end, the incomplete components of the cement element in a bibulous or anhydrous and comminuted state, free from lumps and ready to react into a solid upon contact with the reagent, are thoroughly mixed with the fibrous constituents such as asbestos, (and the desirable inclusions, if any, such as lengths of fine wire), to constitute a non-fictile mass; this is rendered capable of primary cohesion under great pressures by a liquid addition (preferably of the cement-setting reagent, such as water) in quantities less than sufficient to complete reaction, and less than sufficient to promote fluidity of the mass; and the prepared mass is then subjected to molding pressure, which may be of the order of 5,000 pounds to the square inch, for the purpose of forming the materials into substantially the finished shape, the formed shape being of sufficient cohesive strength to allow of completion of the cementing reaction without substantial distortion of the molded shape or handling damage.

The cementitious binder employed may be any substance capable of participating in the preliminary molding operation as herein described, and of reacting with a suitable reagent to solidify or set into a solid, cohesive structure of the desired properties; and which will not soften or decompose under heat. Numerous materials possess these properties, for example plaster of Paris, magnesite (magnesium oxide), magnesium oxychloride, and the crystallizing or hydrating cements generally, such as Portland cement and other hydraulic cements, all of which react with water to solidify.

In practice, the fibrous base material is thoroughly mixed with the finely powdered and screened cementitious binder, preferably Portland cement, in any ordinary type of mixing machine; a charge for the primary mixture may comprise from 20% to 60% by weight of mixed cementitious material, the remainder being the asbestos fiber and, if desired, fine copper, brass or other metallic wires. When the cement is Portland cement or magnesium oxychloride, a mixture containing 40% of this cement, (of which a fifth part may be plaster of Paris) and 60% of fibre, with or without wire inclusions, is recommended for the generality of products.

For severe conditions, a mixture comprising 100 pounds of clean asbestos fibre, opened and carded, from 12 to 25 pounds of short fine brass or copper wire, and 20 pounds of Portland cement, is found to be eminently satisfactory. Any other strong filamentous inclusion might be employed in situations in which wire is undesirable. The mixture of base material and cementitious binder so produced may now be formed to shape by pressure, for instance in a metal mold suitable to the shape to be made. For molding, the mixture may be dampened with its setting reagent, e. g., water, but the proportion of liquid should not exceed 20% by weight. The purpose is not to form a wet plastic, but so to adjust the component proportions of the materials as to enable the mass to be molded by pressure. The mold, charged and tamped cold and dry, may, for example, be sprinkled with a suitable quantity only of water, and the charge then subjected to appropriate high pressure; application of the molding moisture is recommended to be so made.

A pressure of two or three tons to the square inch is advisable to insure a solid, uniformly resistant mass adapted to withstand subsequent high pressure without damage. But it is not necessary to prolong the application of pressure; several seconds duration is usually sufficient. Upon removal from the mold, the shaped article is hard, firm and strong, and may be handled and stored without injury. Slight activation of the cement by the moisture added may contribute to this result, but substantial or complete setting of the cement has not been effected, and the mass is predominantly a mechanical aggregate at this stage, which is sufficiently strong for removal from the mold and handling. In the mass so formed the relatively dry cementitious material is uniformly dispersed throughout the molded shape, compacted into intimate physical contact with the fibrous and other inclusions, and substantially without voids of gross dimensions. The subsequent behavior of the material may be attributed in part to the presence throughout the material of voids of capillary size.

Subsequent treatment may, however, be carried out in the mold, or a part of the mold; for example, the block 5 of Fig. 2 and the shoe casting 6 need not be separated, the block 5 remaining attached to the walls of the cavity in the brake shoe.

To effect completion and setting of the cementitious binder, the molded article may now be subjected to gradual absorption of the reagent appropriate to completion of the cementitious element. If, as in the preferred case, the comminuted cement is an anhydrous form of the completed cement, this step may be carried out by exposure of the molded shape to an atmosphere heavily charged with water-vapor during several days or weeks, this time depending upon the thickness of the molded shape and its capillary characteristics, but in any case for a sufficiently long period thoroughly to supply to all of the interstices enough water in a vaporous or nebulous state to solidify the cement. Exposure for three weeks in a "fog room," a chamber maintained at a temperature of about 38° to 43° C., in which the air is heavily laden with water-vapor, under conditions not conducive to precipitation of moisture upon the molded shapes (e. g., the shapes are kept at a temperature at least as high as the air), is recommended. Upon removal from the fog room, the molded shapes have attained a high solidity and strength.

The articles are now subjected to a suitably elevated temperature, for example, from 70° to 82° C., until substantially all excess of the cement-setting reagent above that required by the setting reaction is vaporized and removed from its internal structure. Thorough drying is important to successful completion of the manufacture. But this desiccation should not be carried out to such a degree, nor at such a temperature, as to dehydrate or decompose the solidified cement.

The fog-room treatment may be so controlled as to provide approximately a sufficient amount only of water-vapor to react with and set the cement without any substantial excess, and in that case heating for drying need not be prolonged beyond the time required for removal of superficial excess moisture.

The product may now be completed by thorough impregnation with an oily material or composition, preferably in accordance with the method of the Letters Patent to William R. Seigle, Nos. 1,395,744, dated November 1, 1921, and 1,436,362 dated November 21, 1922. The preferred material is China wood, or tung, oil (or a composition containing this material as a solvent) which may or may not be partially hydrogenated prior to use, and which is reduced to a molecularly saturated state after impregnation. If unaltered or non-saturated tung oil be employed, the procedure involves immersing the formed and dried shapes, preferably while hot from drying, in the oil, which may be heated for maximum fluidity to about 130° C.; and thereafter heating the articles, if desired in an inert atmosphere of carbon dioxide ($CO_2$), above the temperature and during the time necessary to polymerize the oil by heat, and so change the homogeneous oily impregnant in the capillary spaces to a solid body; for example, heating to about 250° C. for 24 hours. But if the impregnant has been subjected to preliminary catalytic hydrogenation, for example, to a degree at which its iodine number has fallen to from 120 to 130, polymerization by heat may be carried out by subjecting the impregnated shapes to a temperature ranging from 160° to 240° C. more or less, for 24 hours, more or less, in accordance with the thickness of the article treated and the particular state of the impregnant.

The articles so made may be finished to a contact surface by machining or grinding, but one of their more valuable characteristics is found in the relative accuracy of their retention of their molded form. This method of manufacture therefore produces a product having the industrial advantage of sufficiently reliable accuracy of dimension for interchangeability, a prime consideration in the use principally demanding the product of this invention. For other characteristics the formed shapes are of a material presenting a reliably uniform worn surface of the right quality of coefficient of friction, changeless under heating, and not absorbent of oils; and therefore peculiarly effective as a braking surface in contact with iron or steel brake-drum or clutch members.

I claim:

1. The method of making artificially integrated shaped bodies of pressure-resistant and friction-resistant material comprising as steps, mixing in a dry state a fibrous heat-resistant material a comminuted cementitious material capable of reaching a solidified state on reaction with a reagent and a quantity of said reagent insufficient to cause a complete reaction, compacting these materials under pressure, with partial solidification of the cementitious material, into a sufficiently cohesive molded shape, and causing the cementitious material to be reacted upon thereafter to reach a solidified state while maintaining the said molded shape.

2. The method of making artificially integrated shaped bodies of pressure-resistant and friction-resistant material comprising as steps, mixing in a dry state asbestos and a powdered cementitious substance capable of solidification by reaction with a liquid reagent, applying to the materials a quantity of the reagent insufficient to cause a complete reaction, molding the relatively dry materials to shape under pressure, and thereafter subjecting the molded mass to a solidifying reaction.

3. The method of making artificially integrated shaped bodies of pressure-resistant and friction-resistant material comprising as steps, subjecting a mixture of a bibulous powdered cementitious material, a heat-resisting fibrous substance and moisture in quantity insufficient to cause the materials to reach a fictile state, to molding pressure, and thereafter treating the molded shape to complete a solidifying reaction of the cementitious material.

4. The method of making artificially integrated shaped bodies of pressure-resistant and friction-resistant material comprising as steps, subjecting a mixture of an anhydrous powdered cementitious material, a heat-resisting fibrous substance and moisture in quantity insufficient to cause the materials to reach a fictile state to molding pressure, and thereafter treating the molded shape by exposure to water vapor to complete solidifying reaction of the cementitious material.

5. The method of making artificially integrated shaped bodies of pressure-resistant and friction-resistant material comprising as steps, subjecting a mixture of a bibulous, powdered cementitious material, a heat-resisting fibrous substance and moisture in quantity insufficient to cause the materials to reach a fictile state, to molding pressure sufficient to compact the mass into a state having capillary voids only, and thereafter treating the molded shape to complete solidifying reaction of the cementitious material by slow absorption of a solidifying reagent.

6. The method of making artificially integrated shaped bodies of pressure-resistant and friction-resistant materials comprising as steps, mixing in a dry state asbestos and a powdered cementitious substance capable of solidification by reaction with a liquid reagent, applying to the materials a quantity of the reagent insufficient to cause a complete reaction, molding the relatively dry materials to shape under pressure, and subjecting the molded mass to a solidifying reaction by prolonged exposure to vapors of the reagent.

7. The method of making bodies comprising asbestos and a water-solidifying cement comprising mixing powdered cementitious material and opened fibrous asbestos, moistening the material with insufficient water to cause plasticity or solidification, subjecting the material to pressure, and subjecting the compressed mass thereafter to a moisture-laden atmosphere to cause solidification.

8. The method of making artificially integrated shaped bodies of pressure-resistant and friction-resistant materials comprising as steps, molding a mixture of fibrous heat-resistant material and a comminuted bibulous cement, causing a solidifying reaction of the cement in the molded shape, driving off any excess of the solidifying reagent by heat, and impregnating the capillary spaces of the molded shape with an oily substance capable of a hardening reaction after impregnation.

9. The method of making artificially integrated shaped bodies of pressure-resistant and friction-resistant materials comprising as steps, molding a mixture of fibrous heat-resistant material and a comminuted bibulous cement, causing a solidifying reaction of the cement in the molded shape, driving off any excess of the solidifying reagent by heat, and impregnating the capillary spaces of the molded shape with an oil molecularly saturated in part by an introduced reagent, and capable of hardening after impregnation.

10. The method of making artificially integrated shaped bodies of pressure-resistant and friction-resistant materials comprising as steps, molding a mixture of fibrous heat-resistant material and a comminuted bibulous cement, causing a solidifying reaction of the cement in the molded shape, driving off any excess of the solidifying reagent by heat, and impregnating the capillary spaces of the molded shape with liquid tung oil, and subsequently causing solidification of the impregnant.

11. The method of making artificially integrated shaped bodies of pressure-resistant and friction-resistant materials comprising as steps, molding a mixture of fibrous heat-resistant material and a comminuted bibulous cement, causing a solidifying reaction of the cement in the molded shape, driving off any excess of the solidifying reagent by heat, and impregnating the capillary spaces of the molded shape with liquid tung oil, and subsequently causing solidification of the impregnant by polymerization by heat.

12. The method of making artificially integrated shaped bodies of pressure-resistant and friction-resistant material comprising commingling asbestos fibre, filamentous metallic inclusions and Portland cement in dry powdered form, moistening the aggregate with less than sufficient water to cause the cement to solidify; pressing the aggregate into a mold at pressures of the order of five thousand pounds to the square inch to form a coherent molded shape; completing the solidification of the cement in the molded product; drying the product; impregnating the dry product with a liquid substance capable of solidification by molecular saturation, and solidifying the impregnant.

13. An artificially integrated molded and shaped body for use as a friction member, said body comprising a heat resistant fibrous component everywhere in its substance in intimate cohesive contact with a cementitious element free from an excess of uncombined water, and having therein capillary voids capable of substantially complete saturation with an oily impregnant, said voids being occupied by a molecularly-saturated oily solid.

14. A molded brake block or the like containing fibrous asbestos, a filamentous reinforcing inclusion, and a solidified cementitious binder element everywhere in intimate cohesive contact with said fibrous and filamentous inclusions, voids of the material of said block being occupied by a product of molecular saturation of an oil polymerizable by heat.

Signed by me at New York city this 29th day of April, 1924.

PHILIP A. ANDREWS.